United States Patent [19]

Hook

[11] Patent Number: 4,914,849
[45] Date of Patent: Apr. 10, 1990

[54] FISHING LINE CONNECTING SYSTEM AND METHOD OF CONNECTING A FISHING LINE TO A LURE OR WEIGHT TO BE MOVED THROUGH THE WATER AND COMPONENTS OF SUCH A SYSTEM

[76] Inventor: Dan L. Hook, 6535 Seaview Ave. NW., Seattle, Wash. 98117

[21] Appl. No.: 123,046

[22] Filed: Nov. 19, 1987

[51] Int. Cl.⁴ ............................................. A01K 85/00
[52] U.S. Cl. .................................. 43/42.08; 43/42.23; 43/42.49; 43/42.36
[58] Field of Search ................. 43/42.05, 42.08, 42.23, 43/42.49, 42.36, 43.1

[56] References Cited

U.S. PATENT DOCUMENTS

| | | | |
|---|---|---|---|
| 1,239,956 | 9/1917 | Phinney . | |
| 1,744,366 | 12/1927 | Davenport . | |
| 2,172,889 | 2/1938 | Niemi . | |
| 2,189,958 | 11/1938 | Middlemiss . | |
| 2,225,676 | 12/1940 | White . | |
| 2,255,793 | 9/1941 | Kridler | 43/42.08 |
| 2,444,791 | 4/1946 | Stahnke . | |
| 2,517,299 | 2/1948 | Gaylord . | |
| 2,582,627 | 3/1950 | Gaylord . | |
| 2,729,014 | 1/1956 | Johnson | 43/42.49 |
| 3,010,243 | 11/1961 | Dickinson | 43/42.05 |
| 3,024,562 | 3/1962 | Halling | 43/42.49 |
| 3,056,229 | 9/1961 | Haney . | |
| 3,388,496 | 6/1968 | Good | 43/42.08 |
| 3,708,904 | 1/1973 | Zaharis | 43/42.23 |
| 3,902,267 | 9/1975 | Monchil | 43/42.23 |
| 4,030,225 | 6/1977 | Earley . | |
| 4,112,608 | 9/1978 | McGahee . | |
| 4,177,598 | 12/1979 | Jolley | 43/42.49 |
| 4,468,880 | 9/1984 | Olszewski . | |

Primary Examiner—Kurt Rowan
Attorney, Agent, or Firm—Seed and Berry

[57] ABSTRACT

A fishing system in which removable line connectors can be attached to a lure that is to be pulled through the water to attract a fish. The connectors can be connected to the lure in various ways. The heads of the connectors are preferably eccentrically mounted on a stem of the connectors so that the fishing line, when threaded through the head, will have a different pull angle, depending on the orientation of the head in the lure. The connectors are ideally used with a lure having a bend and a twist and a distinct forward and rear end. The connectors can be removed and repositioned on this type of lure to change the action of the lure through the water. The invention includes a method of removing and reinstalling these lures to change the action. Various additional attachments can be provided in combination wiht the connectors. The invention includes apparatus for changing weights using connectors.

21 Claims, 14 Drawing Sheets

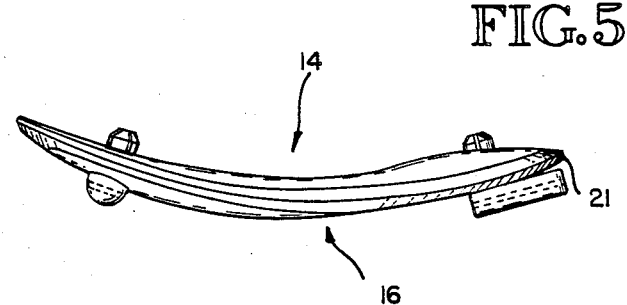
FIG. 5
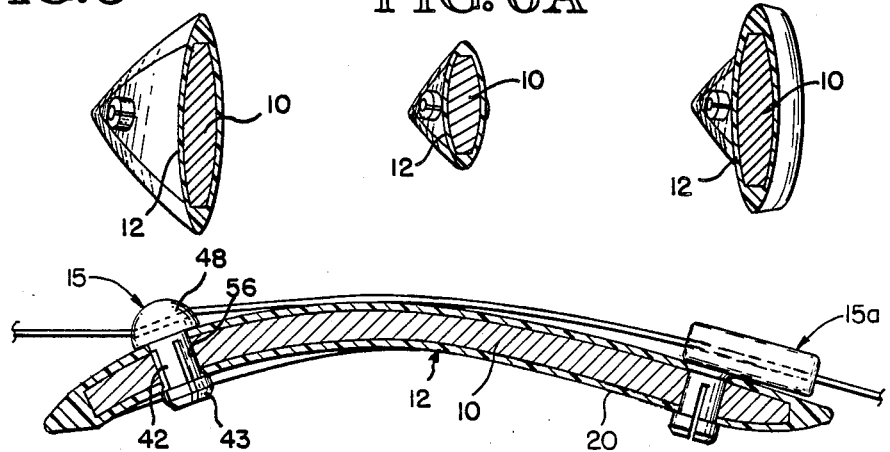
FIG. 6  FIG. 6A  FIG. 6B
FIG. 7
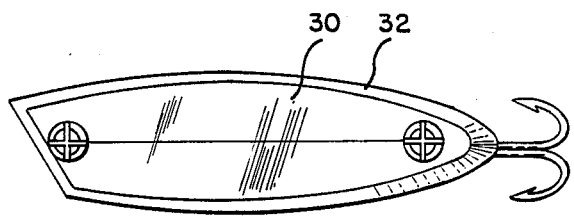
FIG. 8
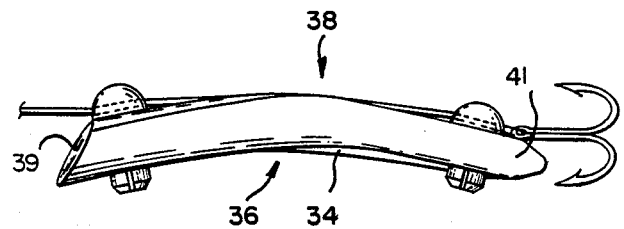
FIG. 8A

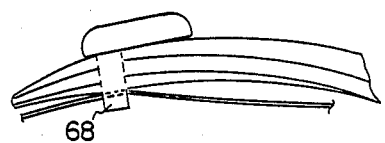
FIG.30
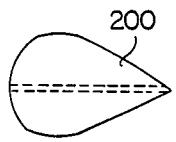
FIG.31
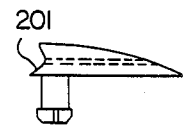
FIG.32
FIG.33
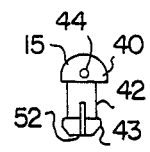
FIG.34
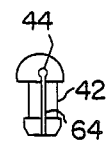
FIG.35
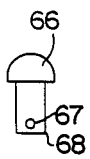
FIG.36
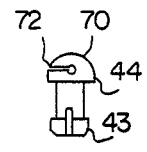
FIG.37
FIG.37C
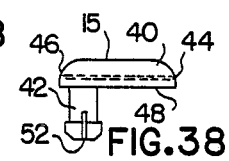
FIG.37A  FIG.37B  FIG.38  FIG.39  FIG.37D
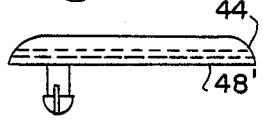
FIG.40
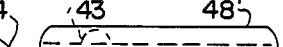
FIG.41
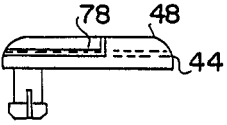
FIG.42
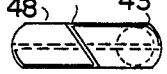
FIG.43
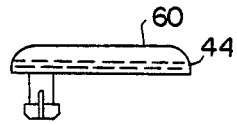
FIG.44
FIG.45
FIG.46
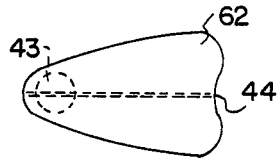
FIG.47
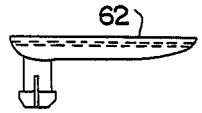
FIG.48

FISHING LINE CONNECTING SYSTEM AND METHOD OF CONNECTING A FISHING LINE TO A LURE OR WEIGHT TO BE MOVED THROUGH THE WATER AND COMPONENTS OF SUCH A SYSTEM

TECHNICAL FIELD

The present invention relates generally to fishing equipment, and more particularly, to (1) fishing lures, (2) fishing line attachment systems that attach the line to lures that are moved through the water by a fishing line and are intended to produce a fish-attracting action to the lure when so pulled, (3) a fishing line connecting system for a weight, and (4) components of such systems. The invention also pertains to a method of changing the action of a lure.

BACKGROUND ART

In the past, spoons have been stamped out of one thickness of metal and equipped with wire fasteners or split rings to hold the hooks and to allow for fishing line attachment, giving the lure only one action capability.

Also, it has been difficult for fishermen to change a lure on the end of a fishing line without first untying the line to the lure and retying a line to the lure. This difficulty oftentimes was a deterrent for the fisherman to use the correct lure for the particular species of fish or fishing conditions existing at the time. For example, fish are known to bite on lures that are trolled through the water at a desired speed, lures that have a particular darting or other action resembling a crippled bait fish, or lures that at a particular time of day may be more attractive to the fish if they have luminescence, a fish-attracting scent or a fish-attracting flavor. One fisherman may be catching fish in a locality where another fisherman a few boats away may be unable to catch a fish. The inability to catch the fish is frequently a result of the lure or the action of the lure.

An ideal shape for a lure simulates a known bait fish and imparts a desired motion through the water that will attract a bite or strike by the fish being sought. Lures heretofore known do not have the desired shape or weight to produce the ideal bait fish simulation or desired motion through the water.

Often a change in the weight and center-of-gravity of that weight on a lure will produce a strikingly different motion for the lure when it is pulled through the water. The motion may greatly improve the ability of that lure to produce a strike from a particular species of fish in a particular water depth or trolling speed. Lures heretofore known do not have the capability of easily changing the weight of a lure.

Weights used for trolling and mooching are connected at one end to the fishing line and at the other end to the lighter fishing line or leader. Often the lines are tied. Often during a fishing trip, the weights must be changed depending on the depth that the fisherman wishes to fish the lure.

DISCLOSURE OF THE INVENTION

The present invention is directed to a connecting system for connecting a fishing line to a lure which enhances the ability of a fisherman to use a variety of lures, produce a variety of actions from a single lure, and provide a method of changing the action of lures.

The invention also is directed to a uniquely shaped fishing lure which, when used with the fishing line connecting system described herein, produces a variety of fishing actions.

The uniquely shaped fishing lure preferably includes a central strip of weighted material that runs along the length of the lure. The strip is provided with a lengthwise twist and a distinctive central bend to produce a concave-convex shape in plan view with a slight compound curvature caused by the lengthwise twist. One end of the lure is slightly larger and less pointed than the other end. The strip is completely encapsulated in clear plastic.

The concepts herein are also directed to components of the fishing system.

The synergistic effect of the unique fishing lure with its shape and weight and the line connecting system which make it easy to change the action of the lure make this a very unique overall line connecting system.

A preferred lure is preferably constructed out of a combination of plastic and metal in order to make possible a unique shape that is essential to the function of its action and that will excite a fish and trigger a strike response. The combination of these materials is also important in establishing the proper density of the lure for specific motions or actions. The combination of the materials and shape combined with the line connection system for a wide variety of lure actions for specific conditions (fish species, water speed, water depth and other variables) makes a lure that can trigger the strike instinct of nearly all game fish.

The line connecting system utilizes line connectors that are designed to be quickly attached to the lure. When used with the lure, they can also be provided with a selection of color, flavor, and luminescence. The line connectors can vary in shape or weight necessary to produce a specific action for the lure.

The action of the lure can be changed also by merely rotating the position of the line connector on the lure, by relocating the line at a different side of the lure, or by rotating the lure 180 degrees on the line.

The line connectors can be virtually any external shape to allow the fisherman to select from a wide variety of shapes for producing a desired drag on the lure. The line connectors can snap into the lure or be fitted with line-receiving holes on either end of the connector such that the line itself can serve as a cotter pin to hold the connector within the lure. In addition, the insert can be attached to the lure by a twist-lock system.

The line can be attached to the connector by being threaded through a hole in the connector, inserted through a slot into a hole in the connector, woven through a serpentine slot in the connector, or the line can be snapped into a straight slot in the connector, and will be released if a fish strikes hard enough to pull the line back out through the slot in the connector.

Line pull may be from either end of an eccentrically shaped connector, allowing different actions when the connector is eccentrically attached to the lure.

Preferably, the connectors are releasible or quickly interchangeable, but they may be permanently attached if desired.

Various fish attractants, such as luminescence, flavor, and odor, can be molded into the line connectors so that the line connectors can be changed without changing the lure and produce a different desired effect of odor, flavor or luminescence. The connectors can also be weighted to change the center of gravity on the lure to produce a different motion or action when pulled through the water.

The advantages of this line connector system are that the connectors replace old-style line attachment fasteners, such as wire fasteners, split rings, brazed rings or screw eyes. The connectors can be made of corrosion-resistant material, such as molded plastic. The connectors' being lightweight can eliminate the weight of conventional snap swivels, thus enhancing the action of the lure. Fine-tuning of the action to produce small differences in action of the lure being pulled through the water can be quickly obtained by merely repositioning the line connectors.

The line connectors generally allow the line to slide through the line connector. The advantage provided by this is that when a fish strikes against the hook, the lure can be bumped forward on the fishing line. This feature eliminates losing fish from screw eyes or split rings that have been damaged from a past strike and which will pull out of the lure on a hard strike.

The plastic material of the line connectors reduces line wear. The connectors allow for quick and easy change of a lure: change of the color, flavor, luminescence and action that be provided with that lure. The connectors can be used with almost all existing lures on the market, weighted or hollow, but advantageously are more useful when used in combination with the lure described as a feature of this invention.

The line connectors can be placed at various locations along the lure. By reversing a line connector that has an eccentric line attachment, a cam action is produced, allowing different actions depending on which direction of the line connector eccentric is forward.

Attachments, such as additional fish-attracting spoons, feathers, light and flavor tubes, can easily be added to the lure.

The interaction of the unique lure shape of this invention and the connectors, which can be repositioned to provide different actions, can provide a sonic knocking action or sound which is also believed to be an attractant to fish in certain environments. The line connectors can be used with conventional leaders. Some of the actions that can be obtained by the lure using the line connectors are adaptable for use with a jigging lure, a casting lure, squid, crank bait, spinner or moocher.

The method of the invention includes the steps of inserting a line connector, or preferably connectors, and the line to a lure at one, or preferably two, spaced points along the length of the lure, then removing the line connector or connectors and reinserting the connector or connectors in a different position on the lure. In one form of the method, a line connector is eccentric and includes the step of pivoting the connector to change the angle of pull of the line on the lure.

Another method of the invention is to change the action or sweep motion of a lure at a fixed trolling speed by changing the weight of the lure. This change in weight can also be combined with a change in the eccentric connection to the lure by use of the line connectors to effect an ever greater change in the sweep motion of the lure.

The line connectors can advantageously be used in pairs to connect opposite ends of an elongated trolling or mooching weight to a fishing line and a leader.

BRIEF DESCRIPTION OF THE DRAWINGS

FIG. 5 is a bottom plan view of the lure shown in FIG. 1.

FIG. 6 is a section taken along the line 6—6 of FIG. 1.

FIG. 6A is a section taken along line 6A—6A of FIG. 1.

FIG. 6B is a section taken along line 6B—6B of FIG. 1.

FIG. 7 is a longitudinal section taken along the line 7—7 of FIG. 1.

FIG. 8 is a side elevation of a second embodiment of a lure.

FIG. 8A is a top plan view of the lure shown in FIG. 8.

FIGS. 30–32 show various types of line connectors to produce different actions.

FIGS. 33–48 are various types of line connectors embodying the principles of the invention.

BEST MODE FOR CARRYING OUT THE INVENTION

Figure 1:
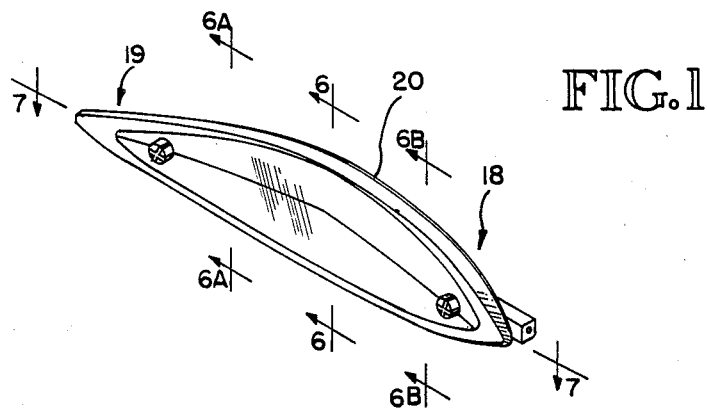
FIG. 1 is an isometric of a preferred fish lure. The lure also shows the line connector system embodying the principles of the invention.
Figure 2:
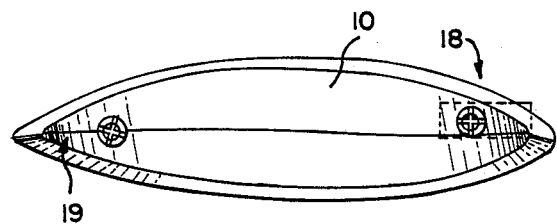
FIG. 2 is a side elevation of the lure in FIG. 1.
Figure 3:
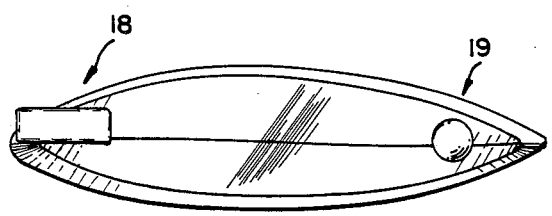
FIG. 3 is an opposite side elevation of the lure shown in FIG. 1.
Figure 4:
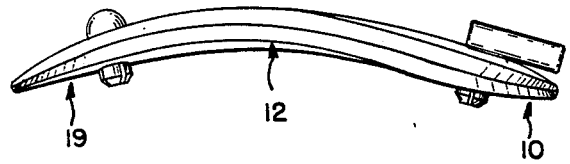
FIG. 4 is a top plan view of the lure shown in FIG. 1.

Starting with the shape of the lure as shown in FIGS. 1-7, 8 and 8A, the preferred shape of the lure, which provides a unique action when trolling at various speeds and at various directions of line pull, has an inner metal strip 10 running approximately the full length of the lure. This strip is of a weight to make the lure produce a desired sweeping motion or action at a desired speed in the water. The strip has a bend 12 and a longitudinal twist to give it a unique compound curvature shape. The compound curvature shape results in there being a concave side 14 and a convex side 16. The strip is encapsulated, or molded, inside a plastic resin cover 20. One end of the lure is larger (end 18) and the other end is smaller and more pointed, as at 19.

The combination of the large end and small end, the heavy metallic strip, the compound curvature twist and bend, and the location of the twist and bend produces a lure shape which has a unique action. The lure can be made to move through the water in a sweeping and darting fashion, which is believed to be the ideal lure action for attracting a fish and causing that fish to strike. The shape is best visualized by viewing the sections in FIGS. 6-6B and FIGS. 49 and 50.

Figure 9:
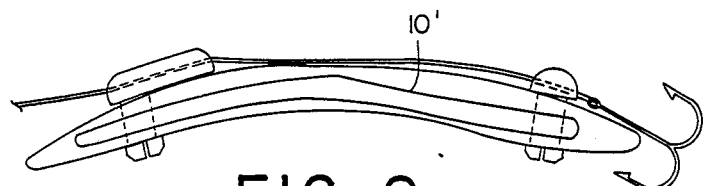
FIG. 9 is a schematic of the lure shown in FIG. 1 showing one size of metal strip.
Figure 10:
FIG. 10 is an additional schematic of the lure shown in FIG. 1 showing another, smaller size of metal strip.
Figure 51:
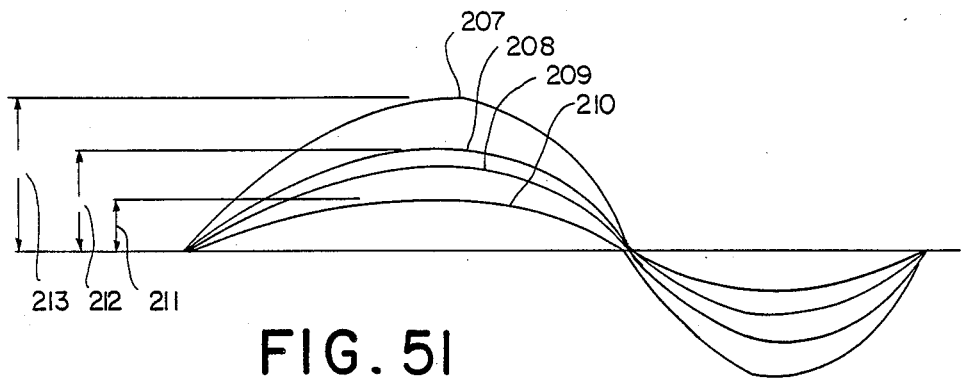
FIGS. 51 and 52 show typical actions or motions of a lure trolled at different speeds and with different weights, connector eccentric lever arms, or both.
Figure 52:
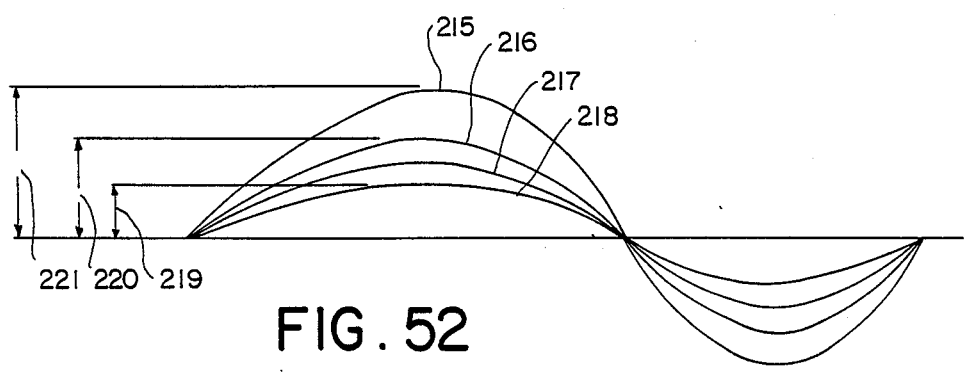

As shown in FIGS. 9 and 10, the metallic weighted member can be made thicker, as shown at 10' in FIG. 9, to provide a desired action at a faster trolling speed, such as 2 to 3 mph or above. The metallic insert can be made of an intermediate thickness, or thin as shown at 10" in FIG. 10. The ideal trolling range for the size and weight of the strip in FIG. 10 is 1 to 1.5 mph trolling speed. The trolling speed, if held constant, will produce a different sweep dimension for a heavy strip than for a lighter strip, as shown in FIGS. 51 and 52, for example. While strips of only two different weights are described, strips of other weights may also be used.

The ideal action of the lure is a wide sweeping motion with an occasional dive triggering a fish strike. The purpose of the metallic weighted strip 10' is to maintain this strike enhancing action at all water speeds. For example, a fisherman who prefers to fish a water speed of 1 to 1.5 mph will have the right action in his lure with the lightweight metallic strip 10'. Furthermore, a lever arm pull from the short end 46 of a connector 15 at these slow speeds will cause the lure to have more resistance to the water, making a wider sweeping action. As the fisherman picks up his trolling speed, say to 2 to 3 mph, the heavy metallic strip 10' combined with a pull location from the short lever arm 46 will provide the widest sweeping action of that greater speed.

The curves in FIGS. 51 and 52 show the light metallic strip lure to have the most pronounced action at slow water speeds, while at these slow speeds the heavier metallic strip lure has less action. Conversely, as trolling water speed is increased, the heavier metallic strip lure becomes the most active, maintaining a fish strike enhancing action, while the lighter metallic strip lure has a less pronounced action.

Therefore, the fisherman, for the first time is able to select the best lure for his personal boat and fishing technique requirements and with the added lever arm variable pull feature can always have the preferred action for varying water and speed conditions.

The metallic strip, with or without appreciable weight, can be provided with a distinctive colored pattern and can be of a reflective- or luminescent-type material. Preferably, the plastic encapsulating coating is translucent, or clear, so that the decorative reflective coating on the metallic strip is highly visible. The plastic material can have its own flavor or odor characteristics.

The twist in the lure is shown to be very slight along the longitudinal length of the lure, with the bend providing a more pronounced concave-convex shape. The sections 6, 6A and 6B correspond to the section lines in FIG. 1.

Figure 49:
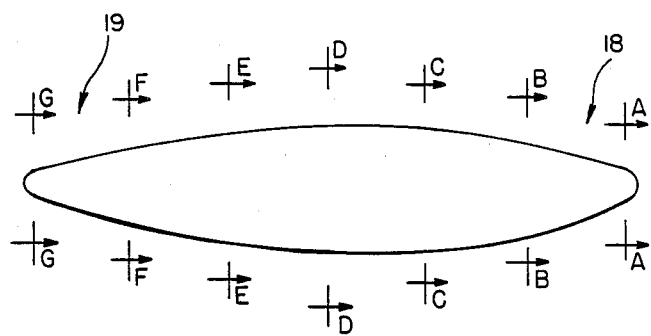
FIGS. 49 and 50 show schematically the shape of the lure of FIG. 1 at different sections along its length.
Figure 50:
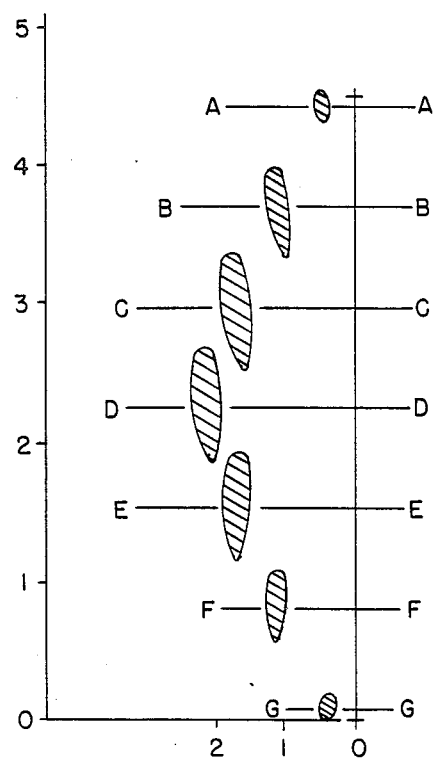

The bend is in approximately the center one-third along the length of the lure. The twist occurs along the full length of the lure, as shown in FIGS. 49 and 50.

FIGS. 8 and 8A show a smaller lure ideally used for mooching rather than trolling. This lure also has a metallic strip 30 embedded in plastic 32. The lure has a bend 34, generally centrally located, to give a concave side 36 and a convex side 38. The lure has a cut-off end 39 cut off at an angle and a tapered end 41. The lure also has a lengthwise twist, as in the lure in FIGS. 1-7.

While the lures described and the variations utilizing different thicknesses of weighted internal strips and the combination of the shape of the lure are unique, this unique shape is ideally used with line connectors (to be described) which can produce eight different actions to one particular lure. While these line connectors are usable with other lures of conventional shape and hollow lures, they provide a synergistic effect when used with the unique lure already described.

The line connectors 15 or inserts are best shown connected to the lure in FIG. 7. Various types of line connectors are described. The basic function of the line connector is preferably to releasibly secure the line to a lure. The line should be able to slide through the line-receiving hole in the connector. Ideally, the line connector can be removed from the lure so that in the case of two line connectors per lure, the line can be removed from the lure without untying the line. Thus the line and connectors can be removed and placed on a different lure, or the line and connectors can be removed and the lure can be reversed or flipped over on one side or the other, that is, the concave side to the convex side, or the lure can be reversed front to rear lengthwise, all without untying the line. This quick changeability gives the fisherman a vast variety of actions from a single lure or the ability to change to different lures. A basic form of the connector 15 is best shown in FIG. 38 and includes a head 40 integrally connected to a stem 42. A retainer 43 is integrally formed on the stem. The head 40 has a line-receiving bore 44. As shown in FIGS. 38 and 39, one form of the head is joined to the stem eccentrically so that there is a shorter end 46 and a longer end 48. As will be described late on, by reversing the elongated head 180 degrees about the axis of the stem, the direction of line pull to the lure can be changed. The amount of length of the long end 48, that is, the amount of eccentricity, will change the line pull direction relative to the lure. FIGS. 40 and 41 show a longer long end 48'.

Either a round head or an eccentric head type connector can be used at either end of a lure depending upon the action desired.

The retainer end 43 is slightly larger than the diameter of the stem and is provided with a compression slot 52. The compression slot allows the retainer end to be compressed to a smaller diameter so that it can be forced through the hole in a lure and then expand naturally to retain the connector within the lure. This is best shown in FIG. 7, where the connector is shown inserted in the lure. The head abuts one side of the lure while the retainer abuts the other end. The retainer after insertion will naturally expand to be of a diameter larger than the hole 56 in the lure.

FIGS. 44 and 45 show the connector having a head 60 with a curvature. FIG. 45 shows the curvature in top plan view. FIG. 46 shows the curvature swung 180 degrees in top plan view.

FIG. 47 shows a larger, flattened head 62. FIG. 48 is a side elevation of the connection of FIG. 47.

FIG. 33 shows a slot 71 joining the line-receiving opening 44. The slot narrows at its center to provide resistance to inadvertent removal of the line when the connector is hanging on the line prior to inserting the connector into the hole 56 in the lure.

FIG. 35 shows a still different type of connector in which the line-receiving bore 44 is joined to a uniform width slot 64 that extends through the length of the stem 42. This slot enables the insert to be slipped over the fishing line so that the line then nests in the bore 44 and the connector is then pushed into the fish lure to retain the line against the lure.

FIG. 36 shows a connector in which a head 66 has no line-receiving hole, but rather the line-receiving hole 67 is in a retainer end 68. In this embodiment, the connector is pushed through the lure and the line is then threaded through the hole 67 to hold the connector in the lure much like a cotter pin. See, for example, FIG. 30.

FIG. 37 shows a connector in which a head 70 is provided with a hole 44 for receiving a line but has a slot 72 of a width less than the diameter of the line. The fishing line can be forced through the slot, since the material of the connector is preferably a resilient plastic. With this connector the fishing line may release from the connector through the slot 72 when a fish strikes the hook.

FIGS. 42 and 43 show a head of a connector in which the fish-receiving bore is a zigzag slot 78 that starts at the top of the head and intersects a line-receiving hole 44. The line is then threaded through the zigzag slot and slides into the hole 44. The zigzag shape of the slot prevents inadvertent separation of the line from the line-receiving hole 44.

Various positions of the connectors relative to the lure and the actions that the various positions provide when the lure is pulled through the water will now be described.

As best shown in FIGS. 11–18, connectors of the type shown in FIGS. 34, 38 and 39 will be described. It should be understood that the other connectors described could be used, but for the purpose of and the simplicity of description of the action, the embodiments of the connectors shown in FIGS. 34, 38 and 39 will be the only ones described.

Figure 11:
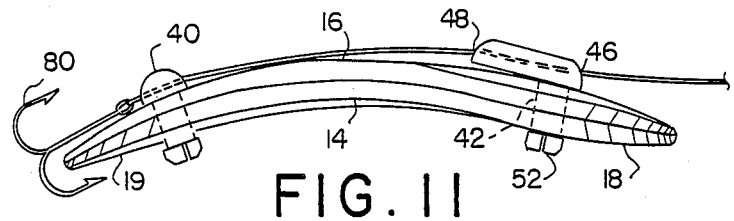
FIGS. 11–18 are schematic illustrations showing various ways of connecting the line connectors to the fishline and to the lure to provide a variety of different actions for the lure.

As shown in FIG. 11, the connectors can be attached to the lure with the large end 18 of the lure forward and the smaller, tapered end 19 rearward. The connector at the forward end has the short end 46 of the head forward and the long end 48 of the head rearward. A noneccentric head connector is on the rearward end of the line. The connectors both have their heads on the convex side 16 of the lure. Now, when a forward pull is provided, the line is joined to the lure very close to the stem 42. The line in this case is generally a fish leader, the leader terminating in a hook 80. The hook will abut against the rearward connector head 40. However, the leader can slide in the holes in the heads so that if a fish strikes the hook—and strikes violently, the fish will push the lure up the leader. This arrangement of the connectors attached to the lure is best used for a slow trolling speed.

Figure 12:
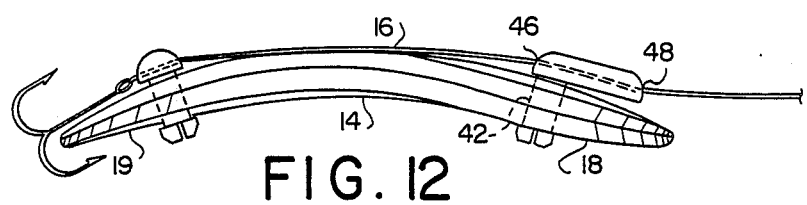

FIG. 12 shows the forward connector having been reversed 180 degrees so that the line now comes in against the long end 48 and the short end 46 is rearward. Both of the heads of the connectors are still on the convex side of the lure. This type of arrangement is considered the best to be used for a faster trolling speed. Since the line joins the lure further offset from the hole 56 and since the head can swivel freely about the hole in the lure, the lever arm provided by the longer end of the head produces a distinctly different action to the lure. It has been found that with the leaders connected on the convex side of the lure, the lure takes a darting, shearing dive, with concurrent spinning.

In FIG. 13, again the larger end 18 is forward and the smaller end 19 of the lure is rearward. The shorter end 46 of the head is forward and the longer end 48 is rearward. The heads are now on the concave side of the lure. This hookup is also best used with a slow trolling speed.

Figure 13:
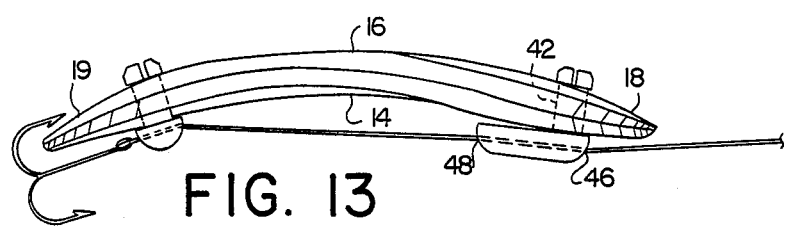

This hookup, as shown in FIG. 13, provides a flutter at a slower speed, and the lure then goes into a spin at higher speeds. At higher speeds, the flutter remains but gives off distinct sound vibrations which can be felt as sharp knocks by the fisherman as the sharp vibrations travel up the line to the fishing pole. An ideal trolling speed is 1.5 to 3 mph with this kind of hookup.

Figure 14:
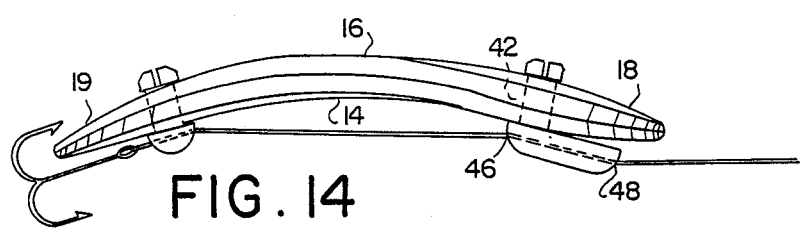

FIG. 14 shows the connectors on the concave side but with the short end 46 of the head rearward and the long end 48 of the head forward. This arrangement is designed for a faster trolling speed.

Figure 15:
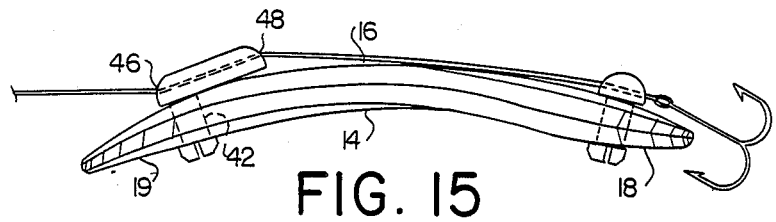

FIG. 15 shows the position of the line connectors being opposite that shown in the earlier figures. That is, the connector which was at the forward end 18 of the lure in FIG. 14 has been removed and placed at the smaller end 19 in FIG. 15. Similarly, the line connector that was positioned in the smaller end 19 shown in FIG. 14 has been removed and placed in the larger end 18 in FIG. 15. This, in effect, is pulling the lure backwards through the water. This reverse pull provides a distinct action different from any of the other actions with the hookups described. In FIG. 15, the now forward line connector is shown with the short end 46 of the head forward and the long end 48 of the head rearward.

Figure 16:
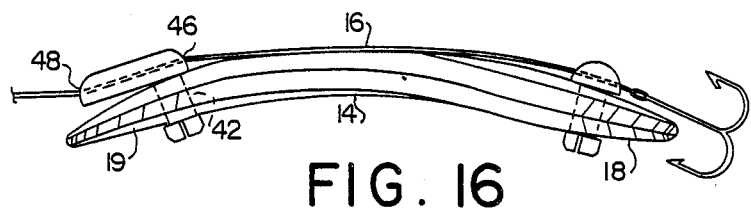
Figure 17:
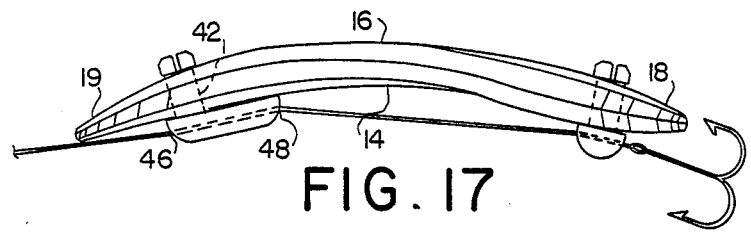
Figure 18:
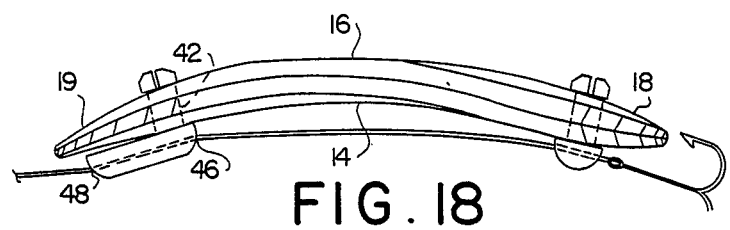

In FIG. 16, the connectors are again in the reverse position on the lure, as in FIG. 15, but the now forward connector has been reversed 180 degrees so that the longer end 48 of the head is forward and the shorter end 46 of the head is rearward. Again, a distinctively different action is provided by this hookup.

FIG. 17 again shows the connectors with the lure reversed, but in this hookup, the connectors are now placed with the heads against the concave side 14 of the lure. The short end 46 of the head is now forward and the long end 48 of the head is now rearward. This hookup produces a distinctive action different from any of the other actions.

FIG. 18 again shows the connectors with the lure reversed. In this hookup, the heads of the connectors are against the concave side 14 of the lure, but with the long end 48 of the head forward and the short end 46 of the head rearward. Again, a distinctive action is provided when this hookup is pulled through the water.

In essence, eight different actions can be provided from the same connectors with the same lure. The actions are (1) lure facing forward, connectors with line against convex side, and short end of forward head is forward, (2) lure facing forward, connectors with line against convex side, and long end of forward head is forward, (3) lure facing forward, connectors with line against concave side, and short end of forward head is forward, (4) lure facing forward, connectors with line against concave side, and long end of forward head is forward, (5) lure reversed, connectors with line against convex side, and short end of forward head is forward, (6) lure reversed, connectors with line against convex side, and long end of forward head is forward, (7) lure reversed, connectors with line against concave side, and short end of forward head is forward, and (8) lure reversed, connectors with line against concave side, and long end of forward head is forward.

In addition to the eight actions produced by using a lure having a heavier or lighter metallic strip 10, the sweep motion will further change, thus again producing a different action in each of the eight actions described.

Figure 19:
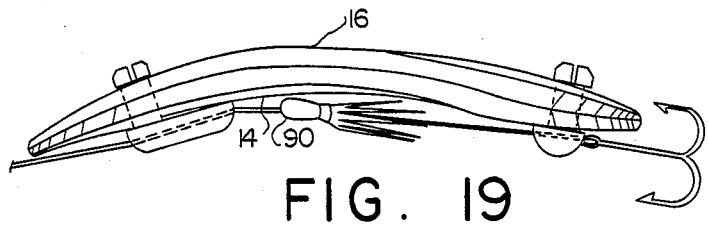
FIGS. 19 and 20 show various ways of attaching additional fish-attracting devices to a lure of the type shown in FIG. 1.
Figure 20:
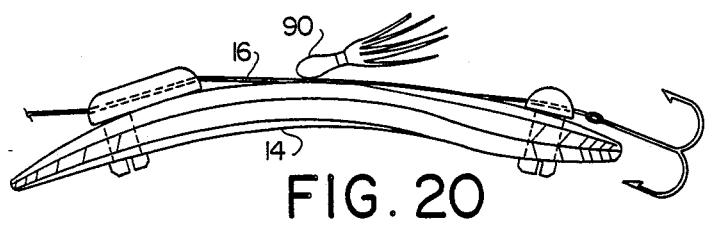

FIGS. 19 and 20 show some of the added versatility of the connector system embodying the principles of the invention. As best shown in FIG. 19, an additional lure, such as a squid 90, can be threaded onto the fishing line, or leader, between the connectors. In FIG. 20, the squid can be placed against the convex side as opposed to the concave side.

Figure 21:
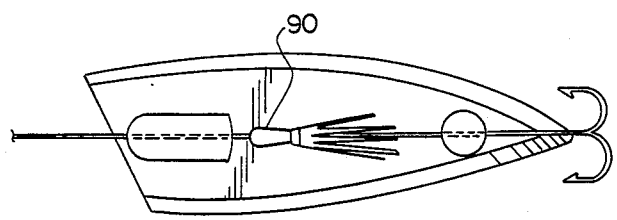
FIGS. 21 and 22 show attaching an additional fish-attracting device to a lure of the type shown in FIG. 8.
Figure 22:
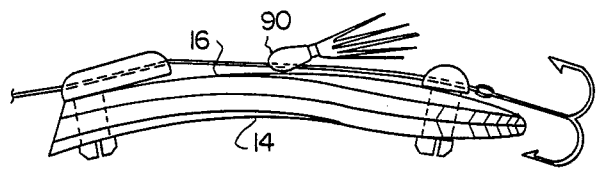

FIGS. 21 and 22 show the use of a squid 90 with a smaller, plug-cut miniature lure, such as shown in FIGS. 8 and 8A.

Figure 23:
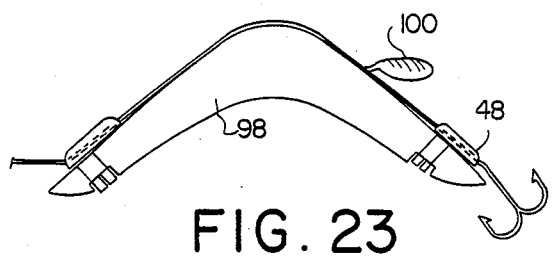
FIG. 23 shows the line connecting system and an additional fish-attracting device employed with a conventional wobble plug shape lure.

FIG. 23 shows the line connectors on a conventional wobble-type plug 98, with the additional lure spinner 100 on the leader. The connectors are again the same as described earlier.

Figure 24:
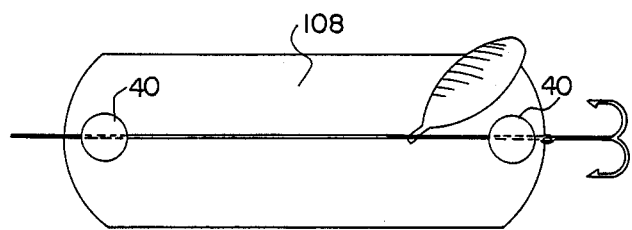
FIG. 24 shows the line connecting system employed with a conventional flasher.

FIG. 24 shows the line connectors connected to a conventional flasher 108.

Figure 25:
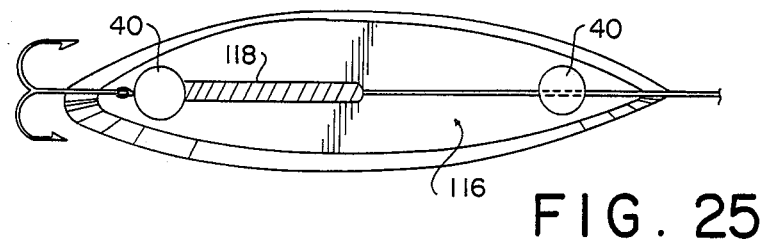
FIG. 25 shows the line connecting system employed with a conventional jig and showing a tubular scent-, flavor- or luminescence-producing device attached to the lure.

FIG. 25 shows the connectors attached to a jig 116. A hollow tube 118 of luminescent, scent, or flavor emitting material may be threaded onto the leader between the connectors, if desired.

Figure 26:
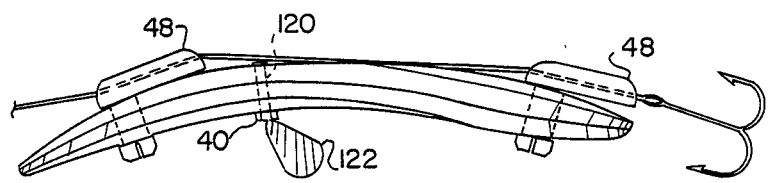
FIG. 26 shows a removable line connector being used to connect an additional accessory fish attracting device to the lure.

FIG. 26 shows the connectors fitted onto a lure of the type shown in FIG. 1. The lure, however, has a bore 120 into which another connector is press-fitted. The connector head 40 may then be attached to a spinner 122.

Figure 27:
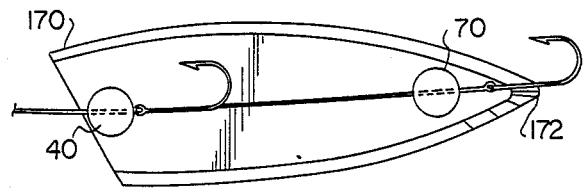
FIGS. 27–29 and 29A show various ways of hooking or connecting a pre-manufactured, double-hook mooching leader to a lure using the line connectors of this invention.
Figure 28:

In the embodiment of FIG. 27, the connector of the type shown in FIG. 33 is illustrated on the forward end 170 of the lure. On the rearward end 172, however, a connector of the type shown in FIG. 37 is provided. This is intended to allow the line to release through the slot 72. In the alternative as shown in FIG. 28, the rearward connector can be a connector such as shown in FIG. 34 with a retainer of a smaller diameter so that it has only a slight friction fit in the hole in the lure. This connector easily releases from the lure. The intent of either connector of FIGS. 34 or 37 is that when a fish strikes, either the rearward connector will release from the lure or the line will release from the slot in the head of the lure, respectively. In addition, the connector of FIG. 34 is weighted in FIG. 28. Any of the connectors may be weighted and connector-receiving holes positioned at different locations along the lure to add weight or change the weight location along the lure. Changing the weight or its location will change the action of the lure by changing its sweep motion through the water.

Figure 29:
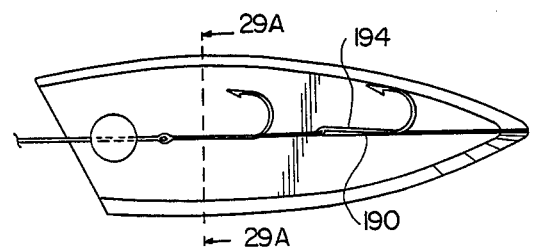
Figure 29A:
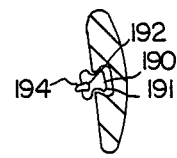

In FIG. 29, a connector of the type shown in FIG. 34 is used in the forward end of the lure; but further back on the lure, a soft plastic insert or inserts 190 are press-fitted into a notch 191 in the lure. The head end of the insert is provided with a slot 192 into which the shank of the hook 194 may be press-fitted.

FIGS. 31 and 32 show a connector having a head with a forwardly facing notch 201. This notch will provide a drag effect on the movement of the lure through the water.

FIGS. 37A and 37C show an insert having an octagonal stem in cross section for positioning in any rotational position in a similarly shaped opening in the lure. FIGS. 37B and 37D show a corrugated peripheral surface on a stem which can be snapped around in a similarly shaped but slightly larger hole in the lure for changing the rotational position of the insert. The plastic will yield sufficiently to allow manual rotation of the connector but will then retain the connector in the new position.

The method of using the connectors is best described as placing a set of connectors into a lure and subsequently removing those connectors with the line intact and changing the position of connectors on the lure. One step is to reverse the forward and rearward positions of the connectors on the lure. An alternative step would be to remove the connectors from a concave side of the lure and replace them in the convex side of the lure. Another alternative step is to use connectors having heads that are eccentrically mounted on the stems of the connector and to reverse the position of the head in the lure 180 degrees so that the line pull is different. This step would apply to merely reversing a single connector of the combination of reversing a connector and reversing the location or changing the location of the connector also on the lure. The step also includes completely removing the connectors from one lure and replacing the connectors into a different lure.

The method in one embodiment will also include the step of substituting a lure having a heavier or lighter metallic strip to change the sweep motion of the lure.

The stem 42 of any connector could be irregularly shaped in transverse cross section, such as octagonal, and fitted into an octagonal hole in the lure. The rotational fixed position of the connector could thus be changed to another angle. Or the stem could be corrugated and the hole corrugated so that the stem could be snapped rotationally like a ratchet into a different rotational position without removing the connector from the hole.

FIG. 49 shows the planes along which the various cross sections of FIG. 50 are correlated. These figures show the twist and the bend of the lure of FIG. 1.

FIGS. 51 and 52 show typical sweep motions of a lure through the water at different speeds and with different connector hookup systems.

FIG. 51 is a schematic chart of the shape of the motion or sweep of a fishing lure of the type shown in FIG. 1 when trolled at a speed of 1 to 1.5 mph. Curve 207 is for a lightweight metallic strip (FIG. 10) having a forward short lever arm 46 connected to the fishing line (leader). Curve 208 is for a lightweight metallic strip having a forward long lever arm 48 connected to the fishing line. Curve 209 is for a heavyweight metallic strip (FIG. 9) having a forward short lever arm connected to the fishing line. Curve 210 is for a heavyweight metallic strip having a forward long lever arm connected to the fishing line. The width of the sweep is shown in the left axis. Reference numeral 211 equals 1 foot, numeral 212 equals 2 feet, and numeral 213 equals 3 feet.

FIG. 52 is a schematic chart of the motion or sweep of a fishing lure of the type shown in FIG. 1 when trolled at a speed of 2 to 3 mph. Curve 215 is for a heavyweight metallic strip (FIG. 9) having a forward short lever arm 46 connected to the fishing line. Curve 216 is for a heavyweight metallic strip having a forward long lever arm 48 connected to the fishing line. Curve 217 is for a lightweight metallic strip having a forward short lever arm connected to the fishing line. Curve 218 is for a lightweight metallic strip having a forward long lever arm connected to the fishing line. The numerals 218, 220 and 221 represent sweep widths of 1 foot, 2 feet and 3 feet, respectively.

These curves show that at certain common trolling speeds, the sweep or width of the motion of the same shape fishing lure traveling through the water will vary, depending on the weight of the metallic strip and the position of the eccentric lever arm of the connector 15 connected to the pulled forward end of the fishing lure.

Figure 53:
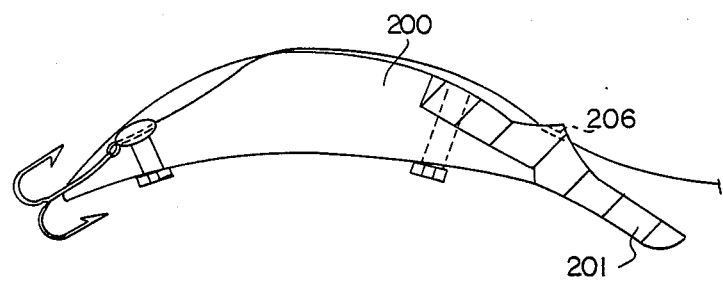
FIG. 53 shows a snap on diving lip on the forward end of a bass line.

FIGS. 53 show a bass lure 200 having a diving lip 201 fixed to the forward end of the lure by a connector having a retainer end 43.

Figure 54:
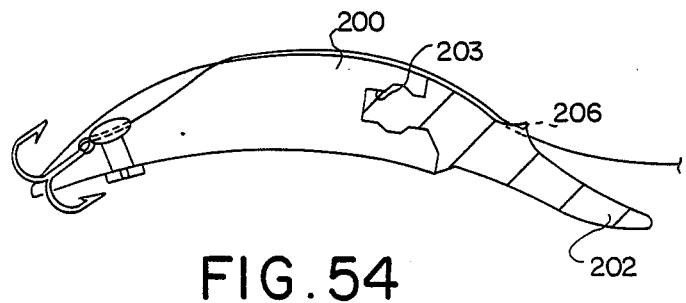
FIG. 54 shows another snap on diving lip.

FIG. 54 shows the bass lure 200 with a diving lip 202 that snaps into a recess 203. In both FIGS. 53 and 54, the diving lip can be removed.

An important feature of the removable lips 201 or 202 is that the line does not terminate at the lip but rather passes through a bore 206 in the lip and connects to the hook at the rear of the lure. This allows the lip to be interchangeable and not subjected to excessive loads as would be the case where the line terminated at the lip.

Figure 55:
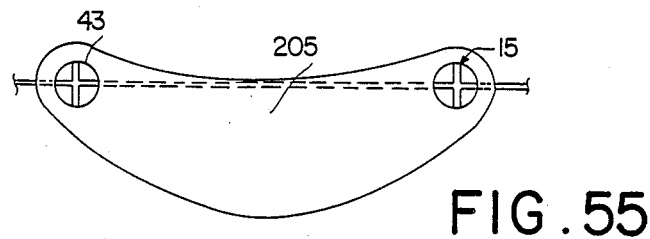
FIG. 55 shows a side elevation of line connectors attached to a trolling or mooching weight.
Figure 56:
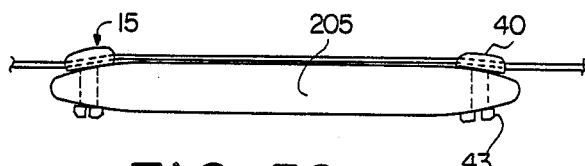
FIG. 56 is a top plan of the weight in FIG. 55.
Figure 57:
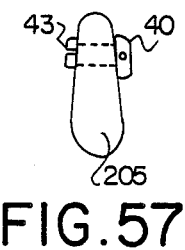
FIG. 57 is an end elevation of the weight of FIG. 56.

FIGS. 55 and 56 show the connectors of the type shown in FIG. 34 inserted into a conventional trolling or mooching weight 205. With this arrangement, the weight can be quickly replaced by snapping the connectors 15 out of the weight and snapping them into a weight of different size or color. The line can remain strong through the connectors and thus need not be tied or untied to switch the weights.

While the preferred embodiments of the invention have been illustrated and described, variations will be apparent to one of ordinary skill in the art. Accordingly the invention is not to be limited to the specific embodiment illustrated in the drawing.

I claim:

1. A fishing lure system which enables the action of a lure to be varied or the lure changed to suit the species of fish being fished and the conditions of speed and depth at which the lure is being fished, comprising:
    a lure body;
    at least one line-holding insert for slidably receiving a fishing line and being insertable within the lure body for slidably securing a fishing line to the lure body; and
    means for releasably connecting the line-holding insert to the lure body, whereby the line is slidably connected through the insert with the lure body and becomes disconnected from the lure body by removing the insert, and with the line being held in the insert outside of the lure body when the insert is connected to the lure body.

2. The system of claim 1, said line-holding insert being weighted.

3. The system of claim 1, said line-holding insert having a fish-attracting scent.

4. The system of claim 1, said line-holding insert having a fish-attracting flavor.

5. The system of claim 1, said line-holding insert having a fish-attracting luminescence.

6. The system of claim 1, said insert having an elongated stem, said stem of said insert having an elongated slot along the axis of the stem, said slot narrowing at one point for holding a line within the slot but allowing the line to pass to hold the line in the slot.

7. A line-connecting insert for a fishing lure, said lure having a body having at least two holes therethrough, said holes spaced along the length of the lure, a pair of inserts each having a line-receiving head and a retainer on opposite sides of a central stem, means for passing a line through said head, and means for releasably retaining the retainer to said lure, a line through each of said heads, a hook on the line end abutting one of said heads and whereby the lure can be replaced by detaching said inserts from the lure with the line intact and reconnecting said inserts within different holes in the same lure or within holes of a different lure.

8. The system of claim 1 wherein the lure is a bass lure having a forward end and a rearward end, said line-holding insert being a diving lip that snaps into the forward end of the lure.

9. The system of claim 8, wherein the diving lip has an aperture and the fishing line passes slidably through the aperture so as not to impose a pulling load on the diving lip.

10. A fishing lure system which enables the action of a lure to be varied to suit the species of fish being fished and the conditions of speed and depth at which the lure is being fished, comprising:
    a lure body;
    at least one line-holding insert for receiving a fishing line; and
    means for releasably connecting the line-holding insert to the lure body and for disconnecting the insert from the lure body, whereby the line is connected through the insert with the lure body and becomes disconnected from the lure body by removing the insert, and with the line being held in the insert outside of the lure body when the insert is connected to the lure body, wherein said lure includes an elongated, weighted, metallic strip encapsulated by a plastic body, said body having a lengthwise axial twist and sidewise bend approximately at the middle of the length along the lure.

11. A fishing lure system which enables the action of a lure to be varied to suit the species of fish being fished and the conditions of speed and depth at which the lure is being fished, comprising:
    a lure body;
    at least one line-holding insert inserted within the lure body for securing a fishing line to the lure body; and
    means for releasably connecting the line-holding insert to the lure body for disconnecting the line from the lure body by releasing the insert, said lure body having at least two holes therethrough, said line-holding insert being releasably inserted into one of said holes, a second line-holding insert releasably inserted into said second hole, said inserts each having a stem, a head having a line-receiving opening, and a retainer, said retainer including means passing through said hole but releasably locking the stem within the hole to releasably attach the insert to the lure, and wherein said lure includes an elongated, weighted, metallic strip encapsulated by a plastic body, said body having a lengthwise axial twist and sidewise bend approximately at the middle of the length along the lure.

12. A fishing lure system which enables the action of a lure to be varied to suit the species of fish being fished and the conditions of speed and depth at which the lure is being fished, comprising:
a lure body;
at least one line-holding insert inserted within the lure body for securing a fishing line to the lure body; and
means for releasably connecting the line-holding insert to the lure body for disconnecting the line from the lure body by releasing the insert, said lure body having at least two holes therethrough, said line-holding insert being releasably inserted into one of said holes, a second line-holding insert releasibly inserted into said second hole, said inserts each having a stem, a head having a line-receiving opening, and a retainer, said retainer including means passing through said hole but releasably locking the stem within the hole to releasably attach the insert to the lure.

13. The system of claim 12, at least one of said inserts having an elongated head which is eccentric relative to said stem, thereby defining a short end and a long end, whereby positioning of the line through the head end can change the lever arm distance of line pull on the lure to change the action of the lure.

14. The system of claim 12, said lure having forward and rearward ends, one of said holes for said line-holding inserts being at the rearward end, said line-holding insert at the rearward end of the lure having means for easily separating the line from the lure in response to a strong rearward pull on the line.

15. The system to claim 14, said means for easily separating the line from the lure including a slot in said head communicating with said line-receiving opening for allowing the line to be pulled from said line-receiving opening.

16. The system of claim 14, said means for easily separating the line from the lure including a small diameter retainer having a slight friction fit with said insert-receiving hole so that the line is separated from the lure by the insert being pulled from said lure.

17. The system of claim 13 wherein said lure includes an elongated, weighted, metallic strip encapsulated by a plastic body, said metallic strip and body having a lengthwise axial twist and sidewise bend approximately at the middle of the length along the lure.

18. The system of claim 13 wherein each insert has an elongated head which is eccentric relative to said stem.

19. The system of claim 12, including a fishing line passing through said inserts, and a second lure connected to said line between said inserts.

20. The system of claim 12 wherein said lure includes an elongated, weighted, metallic strip encapsulated by a plastic body, said metallic strip and body having a lengthwise axial twist and sidewise bend approximately at the middle of the length along the lure.

21. A fishing lure system which enables the action of a lure to be varied or the lure changed to suit the species of fish being fished and the conditions of speed and depth at which the lure is being fished, comprising:
a lure body having an opening;
at least one line-holding insert for receiving a fishing line and being insertable within the lure body for securing a fishing line to the lure body; and
said insert including an enlarged head, joined to an elongated stem, and retainer means on said stem opposite said enlarged head for releasably connecting the line-holding insert to the lure body, said insert being inserted into the lure body by pushing the retainer means and stem into the opening in the lure body, leaving the head protruding on the side of the lure body, whereby the line is connected through the insert with the lure body and becomes disconnected from the lure body by removing the insert, and with the line being held in the insert outside of the lure body when the insert is connected to the lure body.

* * * * *